Feb. 6, 1962     O. EVEN-TOV     3,019,870
BRAKE AND CLUTCH DRIVING AND HOLDING CIRCUIT
Filed Jan. 8, 1960     2 Sheets-Sheet 1
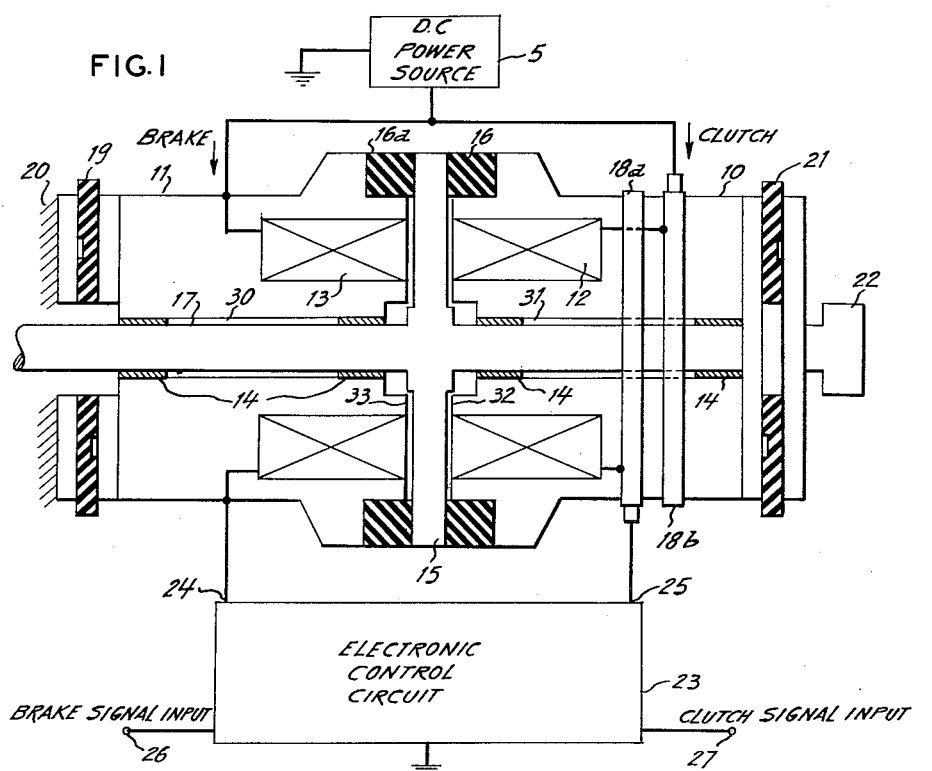
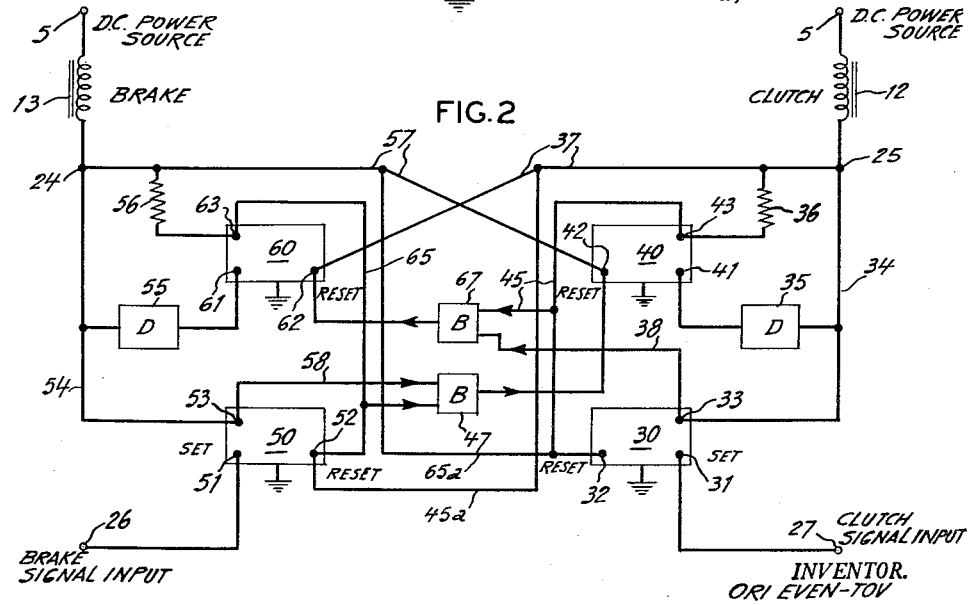
INVENTOR.
ORI EVEN-TOV
BY Charles C. English
AGENT Feb. 6, 1962     O. EVEN-TOV     3,019,870
BRAKE AND CLUTCH DRIVING AND HOLDING CIRCUIT
Filed Jan. 8, 1960     2 Sheets-Sheet 2
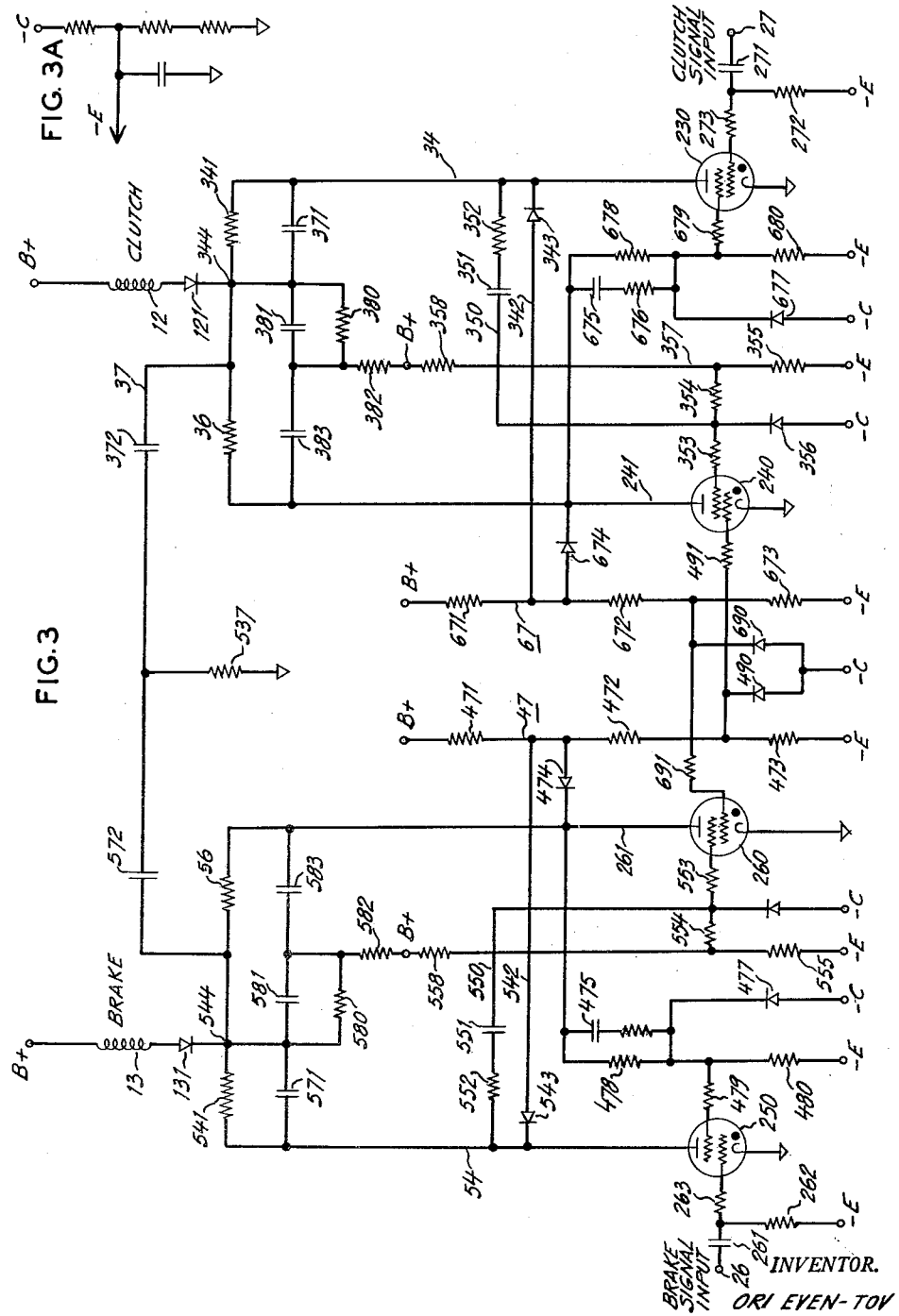
INVENTOR.
ORI EVEN-TOV
BY
AGENT United States Patent Office 3,019,870
Patented Feb. 6, 1962

3,019,870
BRAKE AND CLUTCH DRIVING AND
HOLDING CIRCUIT
Ori Even-Tov, Johnsville, Pa., assignor to Sperry Rand Corporation, New York, N.Y., a corporation of Delaware
Filed Jan. 8, 1960, Ser. No. 1,284
20 Claims. (Cl. 192—18)

This invention relates to actuating circuits. More particularly it relates to an actuator circuit used in conjunction with an electrically controlled clutch and brake combination. In such a combination, there is often to be found a rotary output shaft coupled to a drive shaft by means of a clutch mechanism so that actuation of the clutch by any of several different means results in the transmission of power from the drive shaft to the output shaft. Operating in conjunction with the output shaft in such an arrangement there will often be found a brake, whereby, when it is desired that rotation of the output shaft be quickly halted, the brake mechanism may be actuated. Where such a clutch and brake are found in the confines of a single mechanism, it is evidently necessary that the actuation of one should effect the release of the other and should furthermore preclude the operation of the other. The present invention is concerned with this problem to the extent that such a clutch-brake combination may be provided with electrical actuators. The invention provides a circuit wherein an electrically operated clutch-brake mechanism is controlled so that actuation of the brake will release the clutch and vice versa.

The invention, however, is more particularly concerned with a greatly improved circuit which may be employed in many different applications. In certain operations high inertia loads will be found which must be operated in intermittent, or stop-go fashion. Where such loads are engaged for a very short period of time the forces to which coupling mechanisms may be subject are very considerable. In a clutch-brake combination as contemplated by the invention, we may be concerned with use in automatic high speed machinery such as, for example, input-output devices employed in conjunction with electronic computers or other forms of business machines. In such instances, loads and, therefore, clutches may be engaged for periods of time in the order of milliseconds.

Such short periods of time require high acceleration rates when a clutch is engaged and high deceleration rates when a brake is engaged. These higher rates of acceleration and deceleration, of course, require that more torque be exerted by the clutch or brake actuating means and this, in turn, indicates the necessity for high current flows in electromagnetically operated clutch and brake combinations. However, there is a limit to the amount of current which can be employed because of the limits of heat dissipation in the overall clutch-brake mechanism. To avoid this difficulty one may provide a starting current of very high value which lasts during the acceleration or deceleration time. Thereafter a low holding current may be applied during such time as the output shaft is operating at constant speed or being held stationary. It is possible to provide a peak starting current for this purpose by providing a parallel resistance-capacitance network. However, as the loads increase in magnitude, the required time for acceleration similarly increases so that the R-C peaking method eventually requires impractically large capacitors. The invention provides a new and improved circuit for accomplishing the above-indicated desired results without requiring such large capacitors.

Accordingly, an object of the invention is to provide a new and improved actuator circuit.

Another object of the invention is to provide a new and improved actuator circuit for loads which are to be operated in a mutually exclusive manner.

A further objective of the invention is the provision of a new and improved actuator circuit for use in conjunction with an electrically controlled interdependent clutch-brake combination.

Yet another objective of the invention is the provision of a circuit for providing a high initial current to a load for a predetermined period of time, followed by a lower steady current, in which the necessity for using large capacitors has been eliminated.

Still another objective of the invention is the provision of a novel clutch-brake actuator circuit in which gas tubes are employed for the purpose of providing both peaking currents to the loads and holding currents to the loads.

Another objective of the invention is the provision of an electrical circuit having two inputs and two outputs which may exhibit two stable states and one unstable state on either of its two outputs and wherein the occurrence of output signals from one such output precludes the occurrence of output signals from the other such output.

Other objects and advantages will become apparent as the description proceeds.

In the drawings:

FIGURE 1 is a diagrammatic representation of a clutch-brake mechanism as would fall within the purview of the invention and as connected with the control system of the invention.

FIGURE 2 is a diagrammatic representation of the logical scheme of the control circuit as used in the overall arrangement of FIGURE 1.

FIGURE 3 is a schematic diagram showing a typical arrangement of components and interconnections which may be employed to form the logical units of FIGURE 2.

FIGURE 3a is an alternative biasing arrangement which may be used in place of certain of the circuits depicted in FIGURE 3.

Briefly summarized, the invention may be said to provide an actuator circuit having a power source, first and second loads, and first and second control circuits associated with the respective loads wherein each control circuit will provide current to its respective load at a first magnitude, then after a predetermined time delay current will be provided at a second magnitude. The invention includes, of necessity, means whereby the operation of one of the control circuits is effective to terminate operation of the other and that operation of one circuit will preclude operation of the other in the absence of an initial actuating signal to said other.

FIGURE 1 illustrates a clutch-brake combination such as might be used in conjunction with the present invention. It should, of course, be realized that the invention is by no means limited to this particular clutch-brake which is shown herein merely by way of example and not by way of limitation. The clutch-brake combination provides a rotating mechanical input indicated by 22 on FIGURE 1. 22 may represent a prime mover or a coupling in the nature of a belt, gear or spline connection to such a prime mover. Power in the form of rotary motion is transmitted to housing 10 via the coupling 21. Such coupling may, for example, be an Oldham type coupling to provide for axial shifting and misalignment of parts. It will be observed, therefore, that housing 10 is constantly rotating.

Housing 10 contains therein magnetic actuating coil 12. In order to provide current to coil 12, it is necessary to provide slip rings on the exterior of the housing and these are indicated respectively as 18a and 18b.

A further housing 11 is provided in axial alignment with housing 10. Housing 11 may be anchored to a portion of the machine frame indicated as 20 by means of a further Oldham type coupling. Housing 11, in a manner similar to housing 10, contains magnetic coil 13. Since, however, housing 11 is stationary, there is no need to provide slip rings thereon. Axial bores 30 and 31 are provided in both housings and in the assembly of the apparatus such bores are co-linear. These bores are provided with bearings 14 and in the assembled device such bearings serve to support output shaft 17. Mounted integrally with shaft 17 is disk 15 formed from magnetic material. In the assembled apparatus the disk is located between the facing ends 32 and 33 of the housing 10 and 11, respectively. Said housings are further provided with facing rings 16 and 16a, respectively, in rabbets cut around the circumference adjacent the end faces 32 and 33.

Shaft 17 with its integrally formed disk 15 provides the output. When a current is made to flow through the coil 12, magnetic attraction will occur between disk 15 and housing 10. The engagement of the disk with the facing ring 16 results in a transmission of torque from the rotating housing 10 to the disk 15 and ultimately to the output shaft 17. The application of current to the coil 13 results in magnetic attraction betwen housing 11 and disk 15 which, by way of facing ring 16a, tends to bind disk 15 to anchored housing 11 thereby preventing rotation of disk 15 and its shaft 17, or else rapidly halting any existing rotation. It is evident in an arrangement of this nature, first of all, that the clutch coils 12 and the brake coils 13 must not be energized at the same time. In other words, the loads are mutually exclusive in their operation. It is further obvious that where small high speed machinery is involved, with its concomitant necessity for confined and restricted space, the ability of the overall device to dissipate heat will be severely limited and, for this reason, current consumption on the average must be kept low, while yet providing for sufficiently high current to operate the device within the required time limits. For this reason, control circuit 23 is provided as shown on FIGURE 1. When a clutch signal appears at input terminal 27, the clutch circuit will thereupon permit current to flow from the power source 5 by way of slip ring 18b, coil 12, slip ring 18a and the control circuit 23 to a return circuit at a peaking rate for a predetermined time. Following this peaking current, a holding current will be applied by way of the same path as enumerated above. Such holding current will be maintained until such time as a brake signal is received from the brake signal input terminal 26. Such a brake signal will be effective to terminate holding current in the clutch coil 12 and to initiate a peaking current in brake coil 13 which, as in the former instance, after a predetermined time period, will be followed by current to the brake coil at a reduced magnitude for holding purposes.

We turn now to a logical scheme for accomplishing the foregoing results and such logical scheme is shown in FIGURE 2. FIGURE 2, for the most part, represents that part of FIGURE 1 contained within the block 23. FIGURE 2 shows thereon a plurality of devices 30, 40, 50 and 60 which may be for the present purposes regarded as bistable devices. Each such device is provided with a set input and these input terminals are identified respectively as numbers 31, 41, 51 and 61. The devices are also provided respectively with reset input terminals which are indicated respectively as 32, 42, 52 and 62. These devices are such that the application of a signal to their set input terminals causes them to produce an output. Such output signals may appear on terminals 33, 43, 53 and 63, respectively. The application of a signal to their reset terminals will terminate any output signal. Moreover, the continued application of signals to their reset terminals may hold the bistable devices in their no signal condition.

Considering now the manner in which such a plurality of bistable devices may be intercoupled so as to achieve the objects of the invention, it will be noted that bistable device 30 has its input terminal 31 connected to clutch signal input terminal 27 whereby signals calling for actuation of the clutch coil 12 will be applied to set terminal 31. The output terminal 33 of the bistable device 30 is connected by way of path 34 to the clutch coil 12 and thence to the power source 5. Bistable device 30 is used in the clutch-peaking circuit.

The brake-peaking circuit is similar in all respects except, of course, that its set input terminal 51 is connected to the brake signal input terminal 26 and its output terminal 53 is connected by way of path 54 to the brake coil 13 and thence to power source 5. Bistable devices 40 and 60, respectively, are used in the clutch-holding current circuit and the brake holding current circuit.

Path 34 in the clutch-peaking output circuit is coupled to set input terminal 41 of bistable device 40 by way of delay device 35. The output terminal 43 of device 40 is connected to the clutch coil 12 by way of resistance means 36 and junction 25. Similarly, the brake-holding circuit device 60 has its set input terminal 61 coupled to path 54 via delay device 55 and its output terminal 63 coupled to brake coil 13 by way of resistance means 56 and junction 24.

For resetting purposes junction 25 which connects with clutch coil 12, is also coupled by way of path 37 with the reset terminal 62 of the brake-holding bistable device 60 and reset terminal 52 of the brake-peaking bistable device 50. Similarly, junction 24 of the brake-peaking path 54 is coupled to reset terminal 42 on the clutch-holding bistable device 40 and reset terminal 32 on the clutch-peaking bistable device 30 by way of path 57.

In order to provide further interconnections between the circuits, buffers 47 and 67 are provided. It will be noted in the case of the clutch circuits 30 and 40 and the brake circuits 50 and 60, that the output terminals 43 and 63 respectively of the holding bistable devices 40 and 60 are connected to the reset terminals of the peaking devices 30 and 50. Buffers 47 and 67 may be constituted by "OR" gates of the type wherein the occurrence of a signal on any of their inputs results in a signal appearing on their respective outputs. Inputs to buffer 47 are derived from the output terminal 53 of the brake-peaking device 50 by way of a path 58 and from output terminal 63 of brake holding device 60 by way of path 65. The output from buffer 47 is applied to reset terminal 42 on the clutch-holding bistable device 40. Similarly, the inputs to buffer 67 are derived from output terminals 33 and 43 of devices 30 and 40 respectively and the output thereof is applied to reset treminal 62 of brake-holding device 60.

Consider now the operation of the circuit depicted by FIGURE 2. Assume that the brake coil 13 is energized with its holding current whereby the disk 15 and shaft 17 of FIGURE 1 will be held stationary. It is desired to obtain rotaion of output shaft 17 which entails termination of the current flowing to the brake coil 13 and initiation of current flow to coil 12 followed by a holding current to coil 12. To effect these results, an input signal is applied to clutch signal input terminal 27 and is effective to place bistable device 30 into its output producting state. This output producting state has three immediate effects on the other circuit components. The output signal from terminal 33 is applied by way of path 34 to junction 25 and path 37 to reset terminal 62 of the brake-holding bistable device 60 where it operates to terminate current flow to brake coil 13. At the same time, the output signal from terminal 33 is applied to clutch coil 12 whereby current flow therethrough from power source 5 occurs at the maximum peaking rate. Finally, the output signal from terminal 33 is applied to delay device 35 which, after a predetermined time interval, passes the signal on to the input terminal 41 of the clutch-holding bistable device 40. Since, at this time, following the resetting of bistable device 60, there are no reset signals from any source applying to reset terminal 42 of device 40, it will be placed in an output producing state by the appearance of the delayed signal on set terminal 41. This results in an output signal from terminal 43. Such output signal is directed by way of resistance means 36 to clutch coil 13 and it is also directed by way of path 45 to the reset terminal of the clutch-peaking device 30. The result is that device 30 is reset to its non-output-producing state and current continues to be drawn through clutch coil 12 at the much lower rate which is desired for holding purposes and which is occasioned by resistance means 36. It is clear that because of buffer means 67, brake-holding coil 13 cannot be turned on by the holding circuit 60 since such circuit is inhibited from producing any output signal as long as an output signal occurs from either of bistable clutch control circuits 30 or 40. This condition is true up until such time as a signal may be received at the brake signal input terminal 26.

It is clear that the circuit of FIGURE 2 will be symmetrical in operation whereby upon the occurrence of a signal at terminal 26, a similar sequence of events will be followed but in this latter case will involve turning off clutch coil 12 and turning on brake coil 13, again with a period of peaking current followed by a holding current.

In summary, it may be seen from FIGURE 2 that applicant's circuit, in response to a signal on either of its inputs, immediately terminates a signal appearing on the opposite output, initiates a first signal on the corresponding output which lasts for a predetermined time and follows this up with a steady output on the corresponding output terminal until such time as an input signal is received on the other input terminal.

Under certain conditions of operation it is possible that a brake signal input may be received immediately following a clutch signal input and before sufficient time has elapsed to permit the delay means 35 to transmit the output from 30 to the input of bistable holding device 40. Or the opposite may occur and a clutch signal input may be received immediately following a brake signal input. In these instances, the respective outputs from the peaking devices will be transmitted also by way of paths 37 or 57 to the reset input terminals of the counterpart peaking devices. Under such operating conditions the holding devices 40 and 60 may never be set.

It may be seen that by means of resetting paths 37, 57, 45, 65 and 45A—65A, setting of any of the bistable devices will result in a resetting of all of the other bistable devices.

To preclude the "freezing" of the circuit which might occur in the event of simultaneous input signals at both terminals 26 and 27, it has been found desirable in one embodiment of the invention to provide slightly differing delay times for delay means 35 and 55, respectively.

We turn now to a consideration of the detailed schematic circuit diagram shown in FIGURE 3. Herein the bistable devices, indicated respectively as 30, 40, 50 and 60 on FIGURE 2, are shown as gas tubes in the form of thyratrons and are identified in FIGURE 3, respectively as numbers 230, 240, 250 and 260. 230 is the peaking thyratron for the clutch circuit and 240 is the holding thyratron for the clutch circuit. Thyratrons 250 and 260 perform coresponding functions for the brake coil and it is proposed to be describe, in detail, only one half of the circuit in view of the essentials similarity between the two halves corresponding to the clutch control portion and the brake control portion. Consider, therefore, the clutch control portion of the overall circuit. Clutch signal input terminal 27 is coupled by way of capacitor 271 and resistor 273 to the control grid of peak thyratron 230. To the intersection of capacitor 271 and resistor 273 the grid biasing voltage —E is applied by way of biasing resistor 272. The anode circuit of the thyratron 230 is coupled to B+ source by way of clutch coil 12, rectifier 121, junction 344 and resistor 341. The cathode is grounded. The shield of thyratron 230 is connected by way of resistor 679 and bias resistor 680 to a source of bias voltage —E. It is also connected by resistor 679 and by a network consisting of resistor 678 and resistor 676 and capacitor 675 to the anode circuit 241 of holding thyratron 240. The purpose of the aforesaid network will be made apparent hereinafter. The junction of resistor 679 and the network hereinbefore mentioned is clamped to a potential —C by way of diode rectifier 677. This clamp and those mentioned hereinafter serve the purpose of preventing the application of injuriously high potentials to the shields of the respective thyratrons which they serve. Also included in the anode circuit of peak tube 230 is the path including conductor 34, capacitor 371, junction 344, path 37, capacitor 372, capacitor 572, capacitor 581 and capacitor 583 to the conductor 261 in the anode circuit of holding thyratron 260 of the brake-holding circuit. The peak tube anode circuit 34 is further coupled to the anode circuit 241 of hold tube 240, also included in the clutch control portion of the overall circuit, and this latter circuit includes capacitor 371, capaictor 381 and capacitor 383. This anode circuit is also connected to the shield of hold thyratron 240 by way of the R–C network consisting of resistor 352 and capacitor 351. This network provides a delay as we shall demonstrate subsequently. Finally, the anode circuit of peaking tube 230 is connected to buffer circuit 67 by way of rectifier 343.

We now consider the circuits of clutch holding tube 240. Herein again the cathode is grounded. In this case the control grid is connected by way of resistor 491 to the junction of resistors 472 and 473 which form a portion of the buffer circuit 47. Resistor 473 is connected to a source of bias voltage —E and resistor 472 is connected by way of resistor 471 to the high voltage source B+. Furthermore, the control grid is clamped at —C by way of diode 490 connected to the junction of resistors 472, 473 and 491.

The shield of holding thyratron 240, in addition to being coupled into the anode circuit of peak tube 230 as noted hereinabove, is connected to the high voltage source B+ by way of resistors 358, 354 and 353. A bias source —E coupled to the junction of resistors 358 and 354 will determine a normal operating potential to be applied to this shield in the absence of signals transmitted thereto by way of circuit path 350. Again a clamp is applied, this time to the junction of resistors 353 and 354 by way of rectifier 356.

The anode circuit of holding thyratron 240 is coupled by way of resistor 36, junction 344, diode 121 and clutch coil 12 to the high voltage source B+. It is to be noted that the value of resistor 36 will be substantially higher than that of its counterpart 341 in the peaking circuit 34, whereby current expected to flow through circuit 34 will be greatly in excess of that which will normally flow in the circuit 241. The anode of holding tube 240 is also connected by way of capacitors 383, 381 and 371 to the anode of peak tube 230. Finally, said anode circuit is connected to the junction of resistors 671 and 672 of buffer 67 by way of rectifier 674.

In addition, it is noted that a circuit comprising resistors 382 and 380 connects the high voltage source B+ to the junction of capacitors 381 and 371 and that the junction of resistors 382 and 380 is connected to the junction of capacitors 381 and 383.

The two buffer circuits are, in common with the remaining circuit portions, essentially similar to one another. Thus, buffer circuit 67, which includes resistors 671 and 672, to the junction of which are connected lines from the anode circuits of hold tube 240 and peak tube 230 respectively, serves as a link between high voltage source B+ and the control grid of brake hold tube 260. This is essentially similar to the circuit which is provided for the control grid of hold tube 240 by buffer circuit 47.

The brake circuits generally are precisely the same as the clutch circuits whereby an overall symmetrical circuit is obtained. One difference which does exist, however, is between resistors 472 and 672 in the two respective buffers 47 and 67. In order to insure that, upon switching on of the high voltage source B+ the brake will normally go on, resistor 672 has a lower value of resistance than 472 whereby a higher voltage will be applied to the control grid of brake hold thyratron 260 allowing it to fire first. Another difference which does not affect the basic structural symmetry of the circuit stems from the necessity in certain applications to provide peaking current on one side of the circuit over a somewhat longer period of time than for the other. In order to accomplish this, capacitor 351 may be selected to be larger than capacitor 551 whereby the delay introduced by the R-C network comprising 351 and 352 is somewhat longer than that provided by the R-C network 551 and 552.

The operation of the detailed circuit is as follows hereinafter. Assume a quiescent condition wherein there are no signals appearing on either the brake signal input 26 or the clutch input 27 and, furthermore, that the high voltage supply B+ is turned off. Assume next that the high voltage supply B+ is turned on. Referring to the buffer circuits 47 and 67, as hereinabove noted, resistor 672 has a smaller resistance than resistor 472. Since in other respects buffer circuits 47 and 67 are identical, it is apparent that when the B+ supply is turned on potential the junction of resistors 672 and 673 will be somewhat higher than that at the junction of resistors 472 and 473. Accordingly, a higher positive potential will be applied to the grid of brake-holding thyratron 260 than is applied to the grid of clutch-holding thyratron 240 thereby tending to cause brake-holding thyratron 260 to fire immediately. Since the shield is also conditioned for firing on both of the holding thyratrons by way respectively of the high voltage source B+ and resistors 558 and 555 in the case of the brake tube, and 358 and 355 in the case of the clutch tube, it is evident that brake-holding tube 260 will, in fact, fire first. The firing of this tube draws current through brake coil 13, rectifier 131, and resistor 56 thence through the tube to complete the circuit to ground, whereby the brake is held "on." While the brake is in its "on" condition, a steady state exists in the anode circuit 261 of brake-holding tube 260. Since most of the voltage drop in the circuit takes place over the resistor 56, it will be evident that the potential between resistor 56 and the anode of the tube will be at a low level once the tube has fired. This low level is effective, first of all, to cause a low potential to exist on the shield of brake peak tube 250 by way of resistor 478, and because of resistor 480 connecting the shield of brake peak tube 250 to the bias source —E. Accordingly, brake peak tube 250 will be inhibited from firing. Also potential at the junction of resistors 471 and 472 in buffer 47 will be lowered since diode 474 is made conductive by the firing of the brake hold tube. Accordingly, bias source —E is able to exert itself on the control grid of clutch holding tube 240 by way of bias resistor 473. Clutch-peaking thyratron 230 is not turned on at this time because, while its shield is conditioned for firing, no signal has been received on its control grid; accordingly, it is biased off by the application of —E to its control grid via resistors 272 and 273. For similar reasons brake-peaking thyratron will not fire and for the additional reason that its shield will have an inhibit potential applied thereto.

In summary, the initial turning on of the circuit results in the brake being turned on and the fact that the brake-holding thyratron has fired effects an inhibition on the firing of either the brake peak thyratron or the clutch-holding thyratron.

It is now desired to transmit power to a load through the clutch. Accordingly, a signal is applied at the clutch signal input terminal 27. This signal will operate through the capacitor 271 to overcome the normally present bias on the control grid of the peak tube 230 imposed by way of the bias source —E and bias resistor 272. At the same time, the shield of clutch peak tube 230 will be conditioned to a smaller positive potential by way of resistor 678 which is coupled to the B+ source. Since at this time the clutch-holding tube 240 has not fired, potential on its anode will be high whereby similar high potential is applied to the network connecting with the shield of clutch-peaking tube 230. Accordingly, clutch-peaking tube 230 is conditioned for firing at the time the clutch signal input is received.

The firing of clutch-peaking tube 230 brings about several results. A large surge of current is caused to flow through clutch coil 12, rectifier 121, junction 344, resistor 341 and clutch-peaking thyratron 230 to a ground return circuit. As in the previous case of the firing of the brake-holding thyratron 260, it is evident that with the flow of current in this circuit the greatest portion of the voltage drop will occur across the resistor 341. Accordingly, between resistor 341 and the anode of clutch peak thyratron 230 there will be a low potential immediately upon the firing of the tube. This low potential acts as a pulse and such pulse is transmitted by way of capacitor 371, conductor 37, capacitor 372, capacitor 572, capacitor 581 and capacitor 583 to the anode circuit of the brake-holding thyratron 260. By properly dimensioning the capacitors involved in this circuit, it is evident that the duration of this negative-going pulse can be made sufficient to extinguish the conducting of brake-holding thyratron 260, whereupon the potential of its anode circuits once again rises to the B+ value and the grids therein once more assume control. This same negative pulse occasioned by the firing of clutch peak thyratron 230 is also applied to the shield of clutch-holding thyratron 240 by way of the R-C network formed by resistor 352 and capacitor 351 in line 350. The result of the application of this negative-going pulse to the shield of thyratron 240 is the inhibiting of the firing of the tube 240 for a predetermined time. It will be observed that when brake hold tube 260 was extinguished by the pulse from the firing of clutch peak tube 230, the potential of its anode circuit once more moved to maximum value whereby diode 474 was cut off from conduction. The effect of this is that the high voltage B+ is again applied over the network of resistors 471 and 472 to overcome the bias—E of bias resistor 473 applied to the control grid of clutch-holding tube 240. Accordingly, it is clear that at this time the clutch-holding tube 240 would be conditioned for firing were it not for the negative pulse lasting over a predetermined time which is applied to the shield of tube 240. While the negative-going pulse from the firing of thyratron 230 is also applied to the anode circuit 241 of hold tube 240 by way of capacitors 371, 381 and 383, it is clear that this pulse would have no more duration than the pulse which was effective to extinguish the brake hold thyratron 260. Accordingly, it is to be concluded that the R-C network comprising resitsors 352, and the capacitor 351 is necessary in order to prevent premature firing of the clutch hold thyratron 240.

By varying the size of the capacitor 351, it is evident that the duration of the negative pulse occasioned by this particular circuit may be varied and in one embodiment of this invention, this is done. In this particular embodiment of the invention it is found to be desirable to maintain clutch-peaking current over a somewhat longer period than the brake-peaking period. For this reason, capacitor 351 is chosen to be of greater capacitance than capacitor 551 which couples the brake peak thyratron anode circuit 54 to the shield of the brake hold thyratron 260. Except for this difference, which may be preferred in certain applications, and the previously noted differences between resistors 472 and 672 in buffer circuits 47 and 67, respectively, the clutch control circuits and brake control circuits are, in all respects, identical.

After the time delay provided by the R-C network 351, 352, the potential on the shield of clutch hold thyratron 240 will once more rise because of potential appearing on the junction of resistors 358 and 355, it being observed that these resistors are connected across the B+ high voltage source and the bias source —E. As previously noted, the control grid of hold tube 240 has already been conditioned to permit the tube to fire, by the extinguishing of brake hold tube 260 and, at the same time, the duration of the initial pulse from the firing of clutch peak tube 230 will be considerably less than the time delay occasioned by the R-C network effected by capacitor 351 and resistor 352. Accordingly, at the expiration of the aforesaid time delay, the clutch hold tube 240 will fire.

The firing of a hold tube following the firing of a corresponding peaking tube causes several effects not present during the initial conditions as previously enumerated in connection with the initial firing of brake hold thyratron 260. However, it will be noted, as in the case of tube 260, firing of tube 240 again effects a lowered potential at the junction of its anode and resistor 36. It will be noted, in this regard, that resistor 36 may have a resistance several times that of resistor 341 whereby the current flow in the anode circuit 241 of holding tube 240 may be substantially less than current flow during the conduction of the peaking tube 230. In one particular example, resistor 36 has five times the resistance of resistor 341 whereby current flow during peaking is approximately five times current flow during holding. As in the case of the firing of the peaking tube 230, firing of the holding tube 240 likewise causes a negative-going pulse in the anode circuit 241. This will be applied by way of capacitors 383, 381 and 371 to the anode circuit of peak tube 230 thereby to extinguish conduction through that tube and allow its respective grids to resume control thereover once more. It will be evident that this same negative-going pulse will be applied to the shield of peaking tube 230 by way of resistor 678 and by way of an R-C network comprised by capacitor 675 and resistor 676. The purpose of the extra R-C network is the removal of certain peaks which would appear in the voltage wave form were such network not present. Similar networks are found involving resistor 380 and capacitor 381 and capacitors 372, 572 in cooperation with resistor 537. These networks are for the purpose of shaping the output wave forms rather than for exerting any essential control function over the tubes themselves.

With the appearance of steady state conduction on clutch hold tube 240, it is evident that a similar condition prevails as would in the case when brake hold thyratron 260 was conducting. In effect, the low potential appearing between resistor 36 and the anode of holding tube 240 is effective to make diode 674 conductive by virtue of which the control grid of brake hold tube 260 will be biased through resistor 673 to prevent the firing of this tube. Also, it is evident that the steady state of this particular anode circuit will enable the bias source to apply to the shield of peak tube 230 by way of resistor 680 whereby such peak tube is likewise prevented from firing.

In summary, it becomes evident that firing of peak tube 230 allows peak current flow through the clutch coil 12 for a short period of time after which the firing of hold tube 240 takes place. The firing of peak tube 230 also extinguishes conduction of the brake hold tube 260. Following the firing of clutch hold tube 240, clutch peak tube 230 is extinguished and an inhibit on further firing of peak tube 230 is placed along with an inhibit on the firing of brake hold tube 260.

By virtue of conductor 342 and diode 343 which connect buffer circuit 67 to the anode circuit 34 of clutch peak tube 230, it is clear that during conduction of either peak tube 230 or hold tube 240, brake holding tube 260 will necessarily be held extinguished.

It may readily be seen that by virtue of the network of capacitors which interconnects all of the thyratrons, the firing of any thyratron will extinguish any other which may be in a conductive state at that time. Because of the delay circuits effected by R-C networks 352—351 and 552—551, it is possible that, where, for example, a brake input signal immediately followed a clutch input signal, the firing of the brake peak thyratron would extinguish the clutch peak thyratron and the clutch hold thyratron would never fire. A similar situation would arise whenever a clutch input signal followed a brake input signal within a time interval less than that required for delay network 552—551 to permit firing of brake hold thyrarton 260.

From a consideration of the symmetry of the overall circuit, it is evident that a similar sequence of events to the foregoing will follow application of an input signal to the brake signal input terminal 26. In this case, of course, peak current will be drawn through the brake coil 13 for a short period of time and current flow through the clutch coil 12 is stopped.

An alternative method of obtaining the bias voltage —E is shown in FIGURE 3a. Herein a resistor network is coupled between clamp source —C and ground, whereupon the bias voltage may be taken in the junction of two of the resistors. Such circuit may be substituted in the circuit of FIGURE 3 without any essential change in the mode of operation of FIGURE 3.

The values of the various components shown in the circuits of FIGURES 3 and 3a have not been particularly shown inasmuch as it is evident that each specific application of the circuit would require different values which would depend on the actual loads contemplated for the clutch and for the brake. Thus, it is evident that if such a circuit were contemplated for use in controlling a heavy forming press, the values of the components would certainly be much different from those where the clutch-brake combination was to be used in conjunction with an adding machine. The actual selection of proper circuit values is thought to be well within the skill of anyone skilled in the art.

While only one specific embodiment of the circuit of the invention has been shown, it is clear that, in accordance with the logic thereof depicted by FIGURE 2, other embodiments are meant to fall within the scope of the claims hereinunder.

I claim:

1. In an actuator circuit, a power source, first and second load means, first and second sources of input signals associated with said load means respectively, first and second control circuits associated with said load means respectively, each of said control circuits comprising first means effective to connect said power source to the respective load at a first magnitude, second means effective to connect said power source to the respective load at a second magnitude subsequent to a predetermined time delay, and means interconnecting said first and second control circuits, said interconnecting means including transmission means and termination means whereby an input signal effective to actuate one of said control circuits is effective to deactuate the other of said control circuits.

2. In an actuator circuit, a power source, a first load, a first control circuit associated with said first load, a source of input signals associated with said first control circuit whereby application of a control signal conditions said first control circuit to couple said power source to said first load, a second control circuit associated with said first load, delay means interconnecting said first and second control circuits so that the first control circuit applies a signal to the second control circuit after a pedetermined delay thereby to condition said second control circuit to couple said power source to said first load, and to disable said first control circuit, a second load, a second source of input signals, further control circuits responsive to signals from said second source of input signals thereby to couple said power source to said second load and means interconnecting said first and second control circuits and said further control circuits so that a signal applied from either source is effective to disable the control circuits not directly associated therewith.

3. The actuator circuit of claim 2 wherein said control circuits comprise bistable devices.

4. The actuator circuit of claim 3 wherein said bistable devices include gas tubes.

5. A control circuit for loads operated in a mutually exclusive manner comprising a power source, a first load, a second load, each load having associated therewith a pair of control devices, each of said pair of control devices exhibiting a first stable state effective to connect said power source to the associated load and a second stable state effective to disconnect said power source from the associated load, interconnecting means between each of the control devices constituting a pair so that said control devices exert control over each other in addition to controlling the associated load, and interconnecting means between the pair of control devices associated with the first load and the pair of control devices associated with the second load whereby existence of the first stable state on either of the control devices of the pair associated with one of the loads precludes existence of said first stable state on the control devices of the pair associated with the other load.

6. A control circuit for loads operated in a mutually exclusive manner comprising a power source, a first load, a first switching device and a second switching device associated with said first load, enabling means associated with each of said switching devices effective to render said switching devices electrically conductive, disabling means associated with each of said switching devices effective to render said switching devices electrically non-conductive, each of said switching devices having an output coupled in a circuit including said first load and said power source whereby the conductive state of said switching devices is effective to power said first load, delay means coupling the output of said first switching device to the enabling means of said second switching device, means coupling the output of said second switching device to the disabling means of said first switching device so that an enabling of said first switching device effects an enabling of said second switching device after a predetermined time and an enabling of said second switching device effects a disabling of said first switching device, a second load, first and second switching devices associated with said second load, each having outputs and enabling and disabling means and exhibiting conducting and non-conducting states and effective in their conducting states to power said second load, and means interconnecting outputs of the switching devices of the first load with the disabling means of the switching devices of the second load and the outputs of the switching devices of the second load with the disabling means of the first load whereby the powering of one load is effective to terminate the powering of the other load.

7. The control circuit of claim 6 further including means effective to reduce the power supplied to the respective loads via the respective second switching device.

8. The control circuit of claim 6 in which said switching devices comprise gas tubes.

9. The control circuit of claim 8 in which said gas tubes are multi-grid thyratrons.

10. In apparatus of the class described, a driving member, a driven member, electromagnetic clutch means interposed between said driving member and said driven member, electromagnetic brake means associated with said driven member, a control circuit coupled to said clutch means and provided with a clutch signal input terminal, said control circuit including means responsive to a signal at said clutch signal input terminal for supplying current of a first magnitude for a predetermined period of time and thereafter supplying current of a second magnitude for an indeterminate period of time, a control circuit coupled to said brake means and provided with a brake signal input terminal, said last-named control circuit including means responsive to a signal at said brake signal input terminal for supplying current of a first magnitude for a predetermined period of time and thereafter supplying current of a second magnitude for an indeterminate period of time, and means intercoupling said control circuits so that the operation of one such circuit excludes the operation of the other and the initiation of operation of one such circuit terminates the operation of the other.

11. The apparatus of claim 10 wherein both the clutch control circuit and the brake control circuit comprise a pair of bistable devices each bistable device providing an output in response to a first type of input signal and extinguishing any output therefrom in response to a second type of input signal.

12. The apparatus of claim 11 wherein first buffer means is provided thereby to couple any output from either bistable device of the brake control circuit to an input of one of the bistable devices of the clutch control circuit and second buffer means is provided thereby to couple any output from either bistable device of the clutch control circuit to an input of one of the bistable devices of the brake control circuit both of these last-mentioned inputs being of the type to extinguish outputs from the bistable devices to which they are applied.

13. The apparatus of claim 11 wherein said bistable devices comprise gas tubes of the multi-grid thyratron type.

14. In apparatus of the class described, a driving member, a driven member, a clutch interposed between said driving member and said driven member, a brake associated with said driven member, both said clutch and said brake including electromagnetic actuating coils, a power source for supplying current to said actuating coils and a signal responsive control circuit associated with each actuating coil and provided with a signal input terminal operative to switch current to its associated coil in response to an input signal, each of said control circuits including a first thyratron effective when fired to switch current to its associated coil at a first predetermined magnitude, a second thyratron effective when fired to switch current to said associated coil at a second predetermined magnitude lower than the first magnitude, a delay network interconnecting said first and second thyratrons so that firing of said first thyratron triggers said second thyratron after a predetermined time delay and means interconnecting said first and second thyratrons so that firing of said second thyratron extinguishes said first thyratron.

15. In combination, a power source, a load coupled to said power source, first and second thyratrons each having an anode, a cathode and control electrodes, means coupling the anode of said first thyratron to said load, input means connected to a control electrode of said first thyratron whereby said first thyratron is fired responsive to an input signal thereby to draw current from said power source through said load, delay means coupling the anode of said first thyratron to a control electrode of said second thyratron, resistance means coupling the anode of said second thyratron to said load and means coupling the anode of said second thyratron to the anode of said first thyratron, whereby firing of said first thyratron subsequently effects firing of said second thyratron thereby to draw current from said power source through said load at a reduced rate, and firing of said second thyratron extinguishes said first thyratron.

16. The combination of claim 15 wherein said delay means comprises a resistance-capacitance network.

17. In combination, a power source, a first load coupled to said power source, a second load coupled to said power source, first and second thyratrons associated with said first load, third and fourth thyratrons associated with said second load, each of said thyratrons having an anode, a cathode and control electrodes, first and second resistance means coupling the anodes of said first and third thyratrons to said first and second loads respectively, third and fourth resistance means coupling the anodes of said second and fourth thyratrons to said first and second loads respectively, said third and fourth resistance means having a resistance substantially higher than that of said first and second resistance means thereby to effect a greater voltage drop across said third and fourth resistance means, first and second input means coupled to control electrodes of said first and third thyratrons respectively, means interconnecting said first and second thyratrons and said third and fourth thyratrons so that the firing of the first and third thyratrons subsequently effects firing of the second and fourth thyratrons respectively and firing of the second and fourth thyratrons extinguishes said first and third thyratrons respectively, a first intercoupling network coupling the anode of said first thyratron with the anode of said fourth thyratron and coupling the anode of said third thyratron with the anode of said second thyratron so that firing of said first or third thyratrons extinguishes said fourth or second thyratrons, a second intercoupling network coupling a control electrode of said second thyratron with the anode circuits of said third and fourth thyratrons and a third intercoupling network coupling a control electrode of said fourth thyratron with the anode circuits of said first and second thyratrons so that said second thyratron is maintained extinguished when either said third or fourth thyratrons are conducting and said fourth thyratron is maintained extinguished when either said first or second thyratrons are conducting.

18. An electric circuit having first and second inputs and first and second outputs and comprising first and second bistable means connected between said first input and said first output, third and fourth bistable means connected between said second input and said second output, each of said bistable means exhibiting either an output state or a no-output state and said first and third bistable devices exhibiting a substantially higher output than said second and fourth bistable devices respectively, first delay means coupling said first bistable means to said second bistable means, second delay means coupling said third bistable means to said fourth bistable means whereby an output state existing on either said first or third bistable means subsequently triggers an output state on said second or fourth bistable means respectively, means coupling said second bistable means to said first bistable means, means coupling said fourth bistable means to said third bistable means whereby an output state appearing on either said second or fourth bistable means triggers a no-output state on said first or third bistable means respectively, means coupling said first bistable means to said fourth bistable means and means coupling said third bistable means to said second bistable means whereby an output state appearing on said first or third bistable means triggers a no-output state on said fourth or second bistable means respectively, means coupling said first or second bistable means to said fourth bistable means and means coupling said third or fourth bistable means to said second bistable means whereby an output state on either said first or second bistable means maintains a no-output state on said fourth bistable means and an output state on either said third or fourth bistable means maintains a no-output state on said second bistable means, so that said electric circuit exhibits two stable states and one unstable state on either of its two outputs and the occurrence of output signals from one such output precludes the occurrence of output signals from the other such output.

19. The electric circuit of claim 18 wherein each of said bistable means comprises a thyratron having an anode, a cathode and at least one control electrode.

20. In a control system including a source of electrical power, and a load, an improved switch means for coupling the power to the load comprising a first electronic switch device providing a high current output, a second electronic switch device providing a lower current output and shunting said first switch device, each of said switch devices having operating control input means associated therewith, means responsive to an input control signal for operating said first switch device, delay means coupled between the input means of the second switching device and the output of said first switching device so upon operation of the first switching device said second switching device is rendered operative at a predetermined time thereafter and means intercoupling said second switching device and said first switching device so that upon said second switching device being rendered operative said first switching device is rendered inoperative.

References Cited in the file of this patent

UNITED STATES PATENTS

| | | |
|---|---|---|
| 2,299,272 | Hallden | Oct. 20, 1942 |
| 2,946,418 | Leeson | July 26, 1960 |